Feb. 16, 1932.  F. H. CAMPBELL  1,845,125
ANTIGLARE SCREEN
Filed Jan. 17, 1931  2 Sheets-Sheet 1

Inventor
Frank H. Campbell
By Clarence A. O'Brien
Attorney

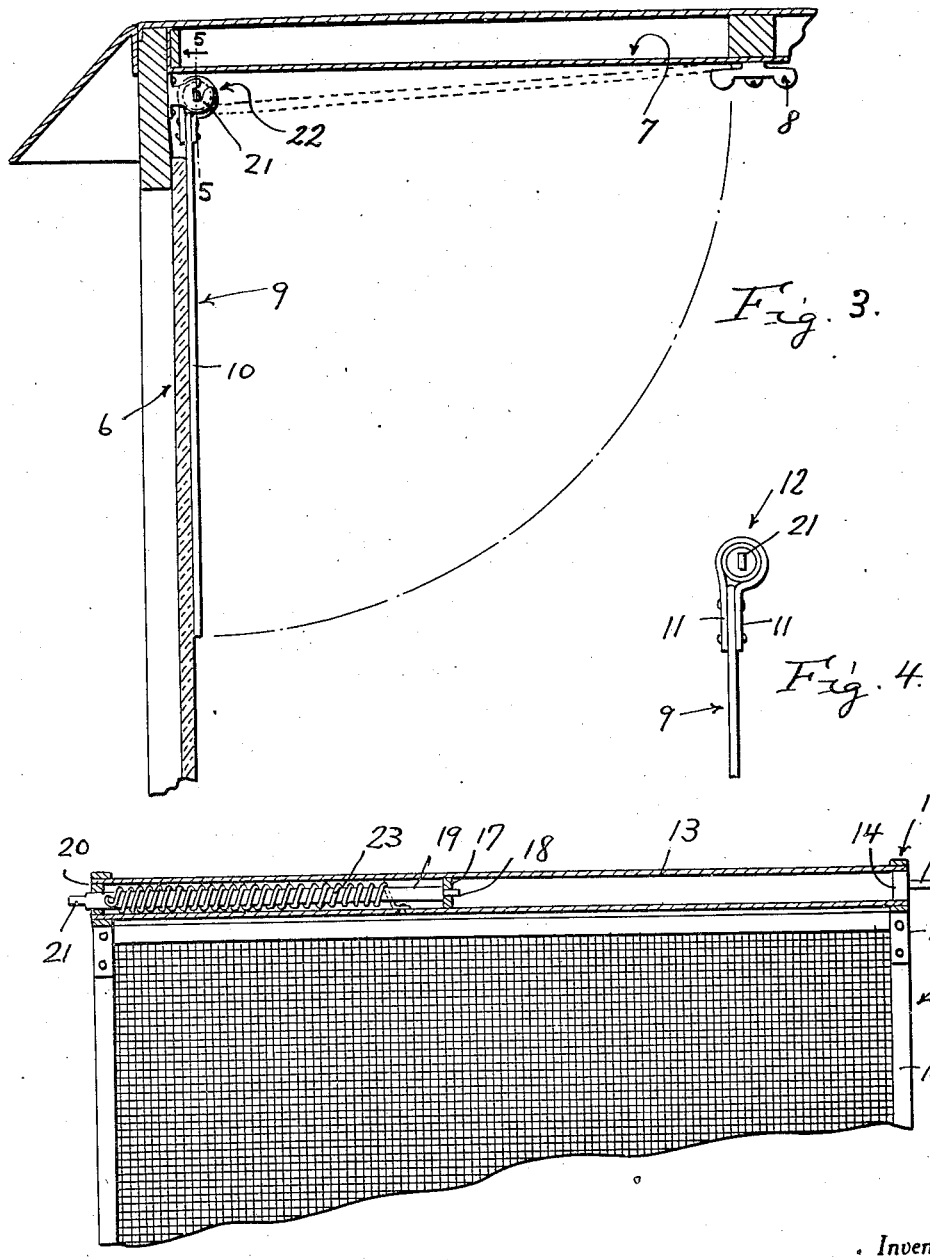

Patented Feb. 16, 1932

1,845,125

UNITED STATES PATENT OFFICE

FRANK H. CAMPBELL, OF LOGAN, WEST VIRGINIA

ANTIGLARE SCREEN

Application filed January 17, 1931. Serial No. 509,486.

This invention relates to a screen designed for detachable association with an automobile windshield and adapted to be temporarily located in the line of vision of the driver, said screen serving as an anti-glare medium for effectively diffusing the headling beams of an approaching machine to promote safe driving and to lessen accidents from flaring headlights.

Briefly stated, the invention comprises a light diffusing screen attached to a spring rotated shaft wherein said shaft is attached by common curtain bracket to the windshield in such a manner as to permit the screen to be supported in an elevated position against the roof of a car when not in use or to swing automatically down into intimate contact with the windshield when desired for usage.

Other features and advantages will become more readily apparent from the following description and drawings.

Figure 3 is a vertical sectional view through the structure depicted in Figure 1.

Figure 4 is a detail end view of the screen and its mounting.

Figure 5 is a section taken approximately on the plane of the line 5—5 of Figure 3.

Figure 1:
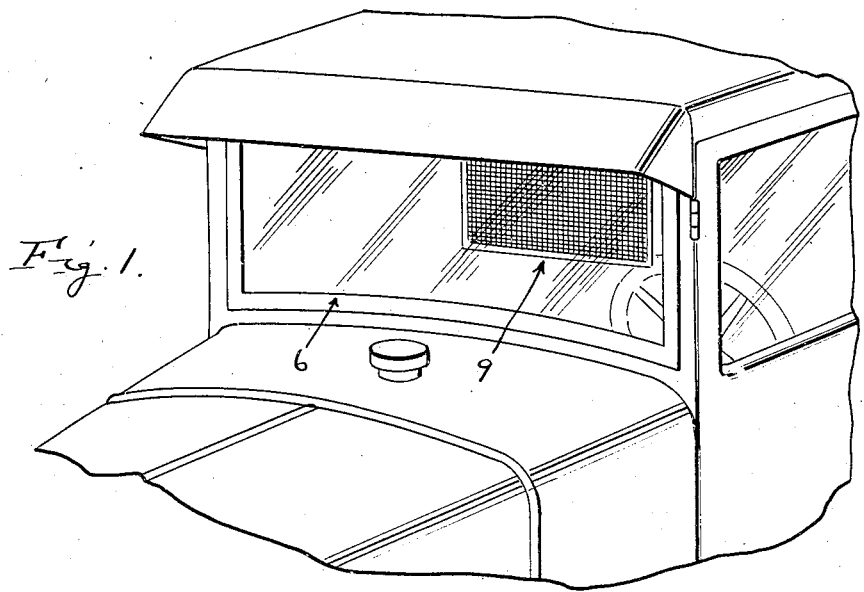
Figure 1 is a perspective view of an automobile embodying the improved screen.
Figure 2:
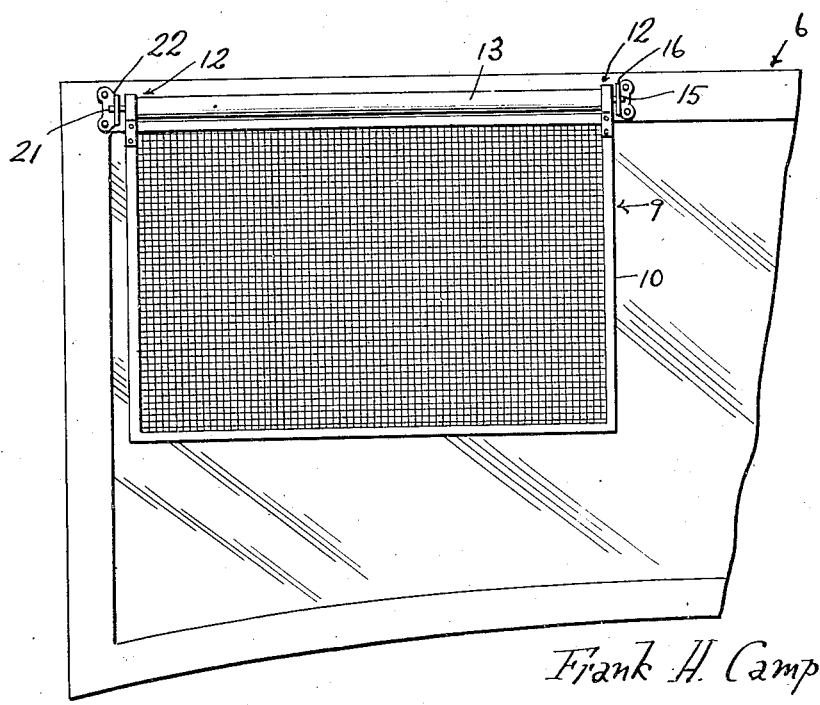
Figure 2 is an inside elevational view showing only the windshield and screen associated therewith.

In Figure 2, the windshield is designated by the numeral 6 and in Figure 3, the roof of the car is denoted by the numeral 7. In accordance with the present invention, a retaining clip, preferably in the form of a turnbutton 8 is mounted on the roof, approximately as shown. The improved screen is designated generally by the numeral 9 and is in the form of a small rectangular screen of appropriate proportions and mesh.

The screen embodies a metal marginal frame 10 and the arm portions 11 of coupling connectors 12 are connected with this frame near the top thereof. The connectors 12 embody the ring-like portions which embrace the opposite end portions of the tubular shaft 13.

At the right hand end of this tubular shaft is a plug 14 carrying a trunnion 15 designed for rotation in an eye attaching bracket 16 which fastens to the top bar of the frame of the windshield as shown better in Figure 2. The numeral 17 in Figure 5 designates a bearing washer receiving the pintle 18 on one end of an inner spring rod 19. The opposite end of the rod extends through a similar bearing washer 20 near the outer end of the tube 13 and terminates in a polygonal extension 21 which is removably seated in the hooked attaching bracket 22 attached to the windshield frame. The numeral 23 designates a coil spring which is attached at one end to the rod 19 and at the opposite end to the tube 13 as detailed in Figure 5.

I thus provide a spring actuated oscillatory shaft 13 wherein the spring action is such as to maintain the screen 9 in contact with the inner surface of the windshield glass as shown in full lines in Figure 3. When however, it is desired to dispose this screen in an out of the way position, it is merely swung up against the tension of the spring and fastened by the clip 8 against the roof 7 of the car thus taking the dotted line position represented in Figure 3.

The gist of the invention is in the provision of conventional shade brackets, these being attached to the windshield or a part of the body of the car in such a position as to accommodate the removable trunnion at the opposite ends of the tubular spring shaft carrying the screen, the arrangement being such as to permit the screen to be either raised or lowered as displayed in Figure 3.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

As a new product of manufacture, an antiglare screen construction of the class described comprising a screen including a wire mesh body portion and a surrounding marginal frame, a tubular open ended shaft, a pair of connecting devices including arms connected to said screen frame and ring-like portions embracing and rigidly connected to the end portions of said tubular shaft, a stationary plug in one end of the shaft provided with a cylindrical journal, a washer in the opposite end of the tube constituting a bearing, a central washer arranged in the intermediate portion of said tube, a spring rod including a pintle journaled in said second named washer and having its outer end extending through the hole in said first named washer, the extending end portion of said rod being of polygonal cross sectional shape, and a coil spring attached at one end to said rod and at its opposite end to the tube, whereby to provide a spring actuated shaft for said screen.

In testimony whereof I affix my signature.

FRANK H. CAMPBELL.